March 16, 1943.   R. G. NORDQUIST   2,313,838
MIRROR ILLUMINATION
Filed Sept. 20, 1941   2 Sheets-Sheet 1
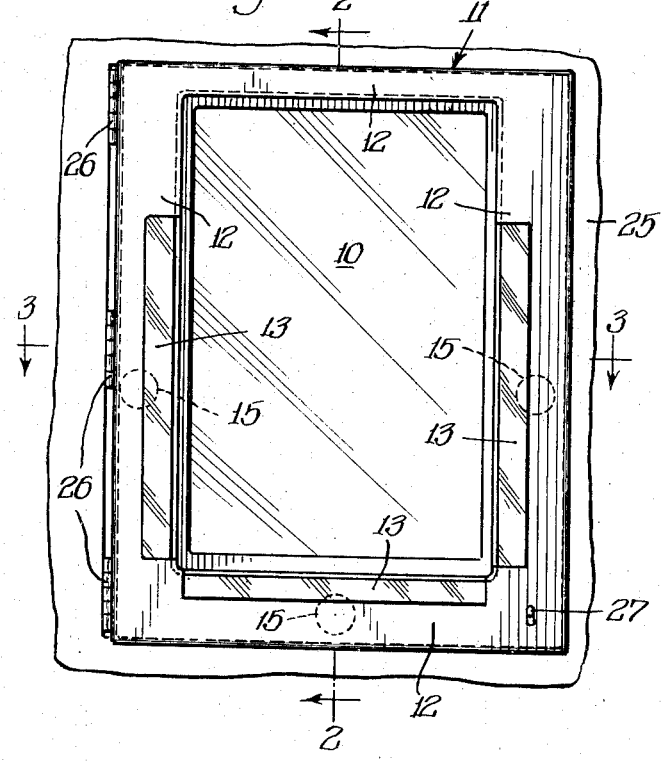
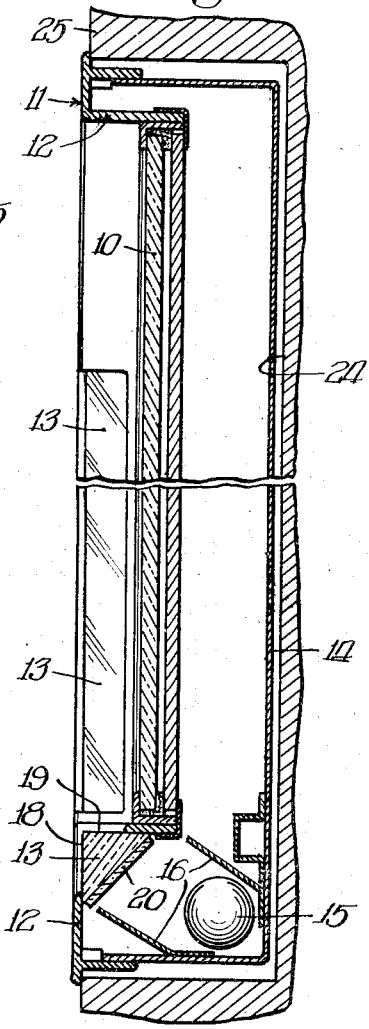
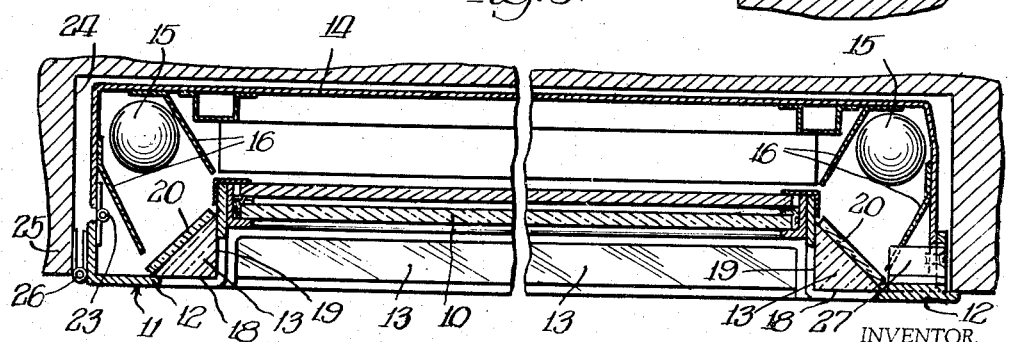
INVENTOR.
Robert G. Nordquist,
BY Cromwell, Greist & Warden
Attys March 16, 1943.　　R. G. NORDQUIST　　2,313,838
MIRROR ILLUMINATION
Filed Sept. 20, 1941　　2 Sheets-Sheet 2

Typical light-emitting point on diffusing screen

Total light beam spread

Total light beam spread

INVENTOR.
Robert G. Nordquist
BY Cromwell, Greist & Warden
attys

Patented Mar. 16, 1943

2,313,838

UNITED STATES PATENT OFFICE 2,313,838

MIRROR ILLUMINATION

Robert G. Nordquist, Chicago, Ill., assignor to Patent License Corporation, Chicago, Ill., a corporation of Illinois Application September 20, 1941, Serial No. 411,765

1 Claim. (Cl. 240—4.2)

This invention has to do with the illumination of mirrors, of the type commonly used in the drawing rooms and compartments of railway sleeping cars, and is particularly concerned with the provision of means, self-contained with respect to the mirror assembly, for illuminating the area immediately in front of the mirror.

One of the objects of the invention is to provide a new and useful lighting arrangement, preferably in the form of a set of prisms, built into the frame of the mirror, which lighting arrangement will give adequate illumination for the mirror, presents an attractive appearance, and is easy and inexpensive to employ.

Other more specific objects and advantages of the invention will be apparent to those skilled in the art upon a full understanding of the construction and function of the novel lighting means.

A preferred embodiment of the invention is presented herein for the purpose of exemplification, but it will of course be appreciated that the invention is susceptible of incorporation in other structurally modified forms coming equally within the scope of the appended claim.

In the accompanying drawings:

Fig. 1 is a face view of a mirror equipped with the improved lighting means;

Fig. 2 is a vertical section, taken on the line 2—2 of Fig. 1;

Fig. 3 is a horizontal section, taken on the line 3—3 of Fig. 1;

Figure 4:
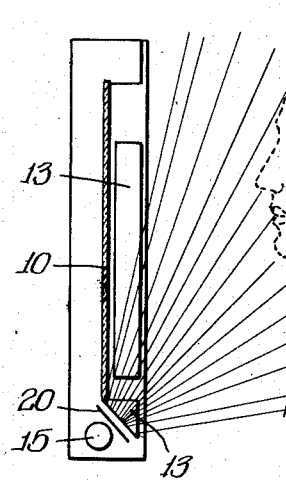
Fig. 4 is a side view of the mirror, showing diagrammatically the way in which the light rays are directed.

The particular mirror assembly chosen to illustrate an embodiment of the invention includes a mirror 10 and a frame 11. The frame 11 is of hollow construction and projects forwardly a short distance beyond the plane of the mirror. The projecting portions 12 of the frame are of generally rectangular cross section and are partially cut away along the sides and bottom of the frame to expose light transmitting panels 13. The frame 11 forms the front of a shallow casing 14. The casing 14 contains a plurality of light bulbs 15, which are located behind the panels 13, and contains a plurality of reflectors 16, which are located behind the bulbs 15.

Each of the panels 13 is a clear glass prism, and is characterized by an angularly disposed light receiving surface 17, a forwardly facing light emitting surface 18, and an inwardly facing light emitting surface 19. The surfaces 18 and 19 are exposed through the cut-away openings in the frame 11, in positions substantially flush with the front and inner surfaces, respectively, of the forwardly projecting portions of the latter. The surface 17, which is positioned in opposition to the light bulb 15 behind the same, is located at an angle of approximately 45° to the surfaces 18 and 19.

Figure 7:
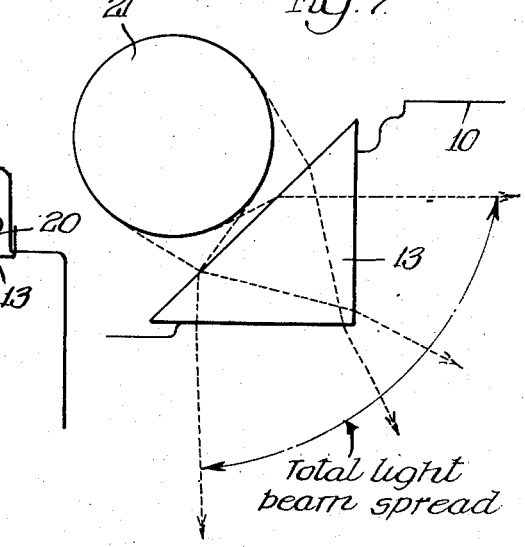
Fig. 7 is a view which is similar to Fig. 6 but shows the light diffusing panel omitted and a longitudinally continuous light source substituted for the single-point light source.

The surface 17 of each prism is preferably covered by a light diffusing panel 20, which may be in the form of a sheet of opal glass. The panel 20, by diffusing the rays of light entering the surface 17, prevents the production of overly intense bright spots in the beam emitted from the surfaces 18 and 19. The panel 20 is desirable where the light source is of the single-point variety, but it can be dispensed with where the light source is continuous and of surface character, as where a tubular bulb 21 (see Fig. 7) of the fluorescent type is used. The reflector 16 behind the bulb 15 serves to build up and even the amount of light on the diffusing screen 20.

Figure 6:
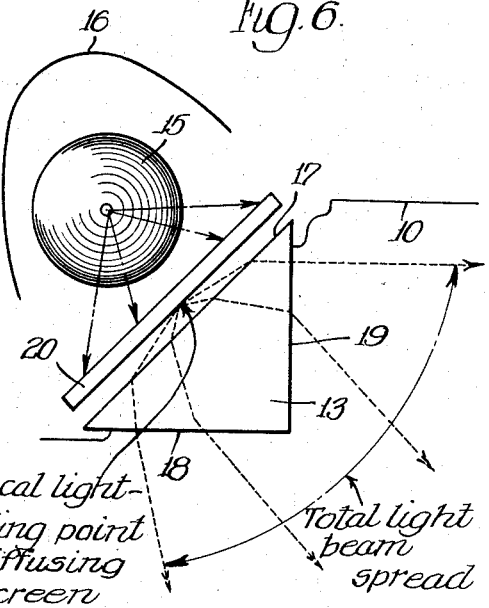
Fig. 6 is a sectional view through one of the margins of the frame of the mirror, showing in more detail the way in which the light rays are directed.
Figure 5:
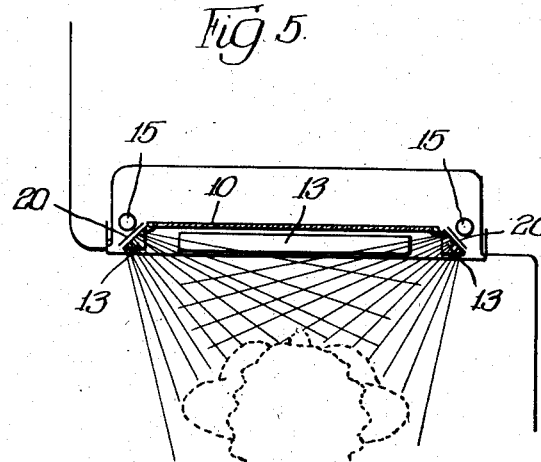
Fig. 5 is a plan view of the mirror, showing the same thing.

The light rays, upon leaving the light diffusing panel 20 and entering the surface 17, are refracted to and through the surfaces 18 and 19, the latter surfaces directing the light rays forwardly and inwardly with respect to the plane of the mirror in a substantially continuous arc of approximately 90°, as illustrated in Fig. 6.

The light emitting surfaces 18 and 19, instead of being flat and disposed at right angles to each other, may be merged in a gradual curve to produce a plano-convex lens shape.

With the controlled and crossed beam arrangement herein described the sides and front of the face of a person standing before the mirror are lighted by overlapping beams of light from units placed at a wide angle away from the face. The front of the face and the underside of the chin and neck are lighted from the bottom unit. All of the surfaces of the face are evenly and brightly lighted, with shadowless light. The lighting units are set at such wide angles from the eyes that they do not appear as glare, thereby affording effective illumination combined with eye comfort.

To give ready access to the prisms, bulbs and reflectors, for cleaning, repair or replacement, the frame 11 and casing 14 may be hinged together at one side at 23 and detachably fastened together at the other side. The frame and casing, as a unit, may advantageously be set back into a recess 24 in the supporting wall 25, and may be hinged at 26 to the wall, flush with the latter, thereby permitting the illuminated mirror assembly to be swung out if desired into any angular position.

The bulbs 15 are preferably connected with a switch 27 mounted in one of the corners of the frame.

I claim:

The combination with a mirror, and a forwardly projecting frame about the same, of elongated light transmitting panels housed within the frame substantially flush with the front and inner surfaces of the forwardly projecting portions of the latter, light sources behind the panels, and reflectors about the light sources, each of said panels being of generally triangular cross section and having an angularly disposed light receiving surface directly opposite its light source, a forwardly facing light emitting surface substantially flush with the front face of the frame, and an inwardly facing light emitting surface substantially flush with the inner face of the frame, with the two last mentioned surfaces so arranged with respect to each other and the angularly disposed surface as to direct light rays forwardly and inwardly with respect to the plane of the mirror in a continuous arc of approximately 90°.

ROBERT G. NORDQUIST.